(12) United States Patent
Huang

(10) Patent No.: US 6,865,531 B1
(45) Date of Patent: Mar. 8, 2005

(54) SPEECH PROCESSING SYSTEM FOR PROCESSING A DEGRADED SPEECH SIGNAL

(75) Inventor: Chao-shih Joseph Huang, Tauyan (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 269 days.

(21) Appl. No.: 09/786,290

(22) PCT Filed: Jun. 27, 2000

(86) PCT No.: PCT/EP00/05963

§ 371 (c)(1),
(2), (4) Date: Mar. 1, 2001

(87) PCT Pub. No.: WO01/03113

PCT Pub. Date: Jan. 11, 2001

(30) Foreign Application Priority Data

Jul. 1, 1999 (EP) .......................................... 99202136

(51) Int. Cl.[7] .............................................. G10L 15/00

(52) U.S. Cl. ...................................... 704/226; 704/244

(58) Field of Search ................................ 704/226, 228, 704/238, 239, 244

(56) References Cited

U.S. PATENT DOCUMENTS

| | | | | |
|---|---|---|---|---|
| 5,727,124 A | | 3/1998 | Lee et al. ................... | 395/242 |
| 5,970,446 A | * | 10/1999 | Goldberg et al. ........... | 704/233 |
| 6,275,800 B1 | * | 8/2001 | Chevalier et al. .......... | 704/246 |
| 6,324,510 B1 | * | 11/2001 | Waibel et al. .............. | 704/256 |
| 6,327,565 B1 | * | 12/2001 | Kuhn et al. ................. | 704/255 |
| 6,389,393 B1 | * | 5/2002 | Gong ......................... | 704/244 |

OTHER PUBLICATIONS

Vjikram Krishnamurthy and John B. Moore, "On–Line Estimation of Hidden Markov Model Parameters Based on the Kullback–Leibler Information Measure," IEEE Trans. Signal Processing, vol. 41, No. 8, Aug. 1993, p. 2557–2573.*

Eiichi Tsuboka and Jun'ichi Nakahashi, "On the Fuzzy Vector Quantization based Hidden Markov Model." IEEE ICASSP 94, Apr. 1994, vol. 1, p. 637–640.*

Anath Sankar and Chin–Hui Lee, "A Maximum–Likelihood Approach to Stochastic Matching for Robust Speech Recognition," IEEE Trans. Speech and Audio Processing, vol. 4, No. 3, May 1996, p. 190–202.*

Lionel Delphin–Poulat, Chafic Mokbel, and Jerome Idier, "Frame–Synchronous Stochastic Matching based on the Kullback–Leibler Information," IEEE ICASSP 98, May 1998, vol. 1, p. 89–92.*

Qi Li, Biing–Hwang Juang, Chin–Hui Lee, Qiru Zhou, and Frank K. Soong, "Recent Advancements in Automatic Speaker Authentication," IEEE Robotics and Automation Magazine, Mar. 1999, p. 24–34.*

* cited by examiner

Primary Examiner—Daniel Abebe

(57) ABSTRACT

A speech processing system, such as a speech recognition or speech coding system, is capable for processing a degraded speech input signal. The system includes an input for receiving the degraded speech input signal. Means 420 are used for estimating a condition, such as the signal-to-noise ratio or bandwidth, of the received input signal. Means 430 are used means for selecting a processing model which corresponds to the estimated signal condition. The model may be retrieved from a storage 440 with models for different signal conditions. Means 430 are also operable to estimate an originally uttered speech signal based on the received input signal and to process the estimated original signal according to the selected model.

13 Claims, 4 Drawing Sheets

SPEECH PROCESSING SYSTEM FOR PROCESSING A DEGRADED SPEECH SIGNAL

BACKGROUND OF THE INVENTION

The invention relates to speech processing, such as speech recognition or speech coding, of a degraded speech signal.

Increasingly automatic speech recognition and coding systems are used. Although the performance of such systems is continuously improving, it is desired that the accuracy be increased further, particularly in adverse environments, such as having a low signal-to-noise ratio (SNR) or a low bandwidth signal. Normally, speech recognition systems compare a representation Y, such as an observation vector with LPC or cepstral components, of an input speech signal against a model $\Lambda_x$ of reference signals, such as hidden Markov models (HMMs) built from representations X, such as reference vectors, of a training speech signal.

In practice a mismatch exists between the conditions under which the reference signals (and thus the models) were obtained and the input signal conditions. Such a mismatch may, in particular, exist in the SNR and/or the bandwidth of the signal. The reference signals are usually relatively clean (high SNR, high bandwidth), whereas the input signal during actual use is distorted (lower SNR, and/or lower bandwidth).

U.S. Pat. No. 5,727,124 describes a stochastic approach for reducing the mismatch between the input signal and the reference model. The known method works by using a maximum-likelihood (ML) approach to reduce the mismatch between the input signal (observed utterance) and the original speech models during recognition of the utterance. The mismatch may be reduced in the following two ways:

A representation Y of the distorted input signal can be mapped to an estimate of an original representation X, so that the original models $\Lambda_x$ which were derived from the original signal representations X can be used for recognition. This mapping operates in the feature space and can be described as $F_v(Y)$, where v are parameters to be estimated.

The original models $\Lambda_x$ can be mapped to transformed models $\Lambda_y$ which better match the observed utterance Y. This mapping operates in the model space and can be described as $G_\eta(\Lambda_x)$, where $\eta$ represents parameters to be estimated. The parameters v and/or $\eta$ are estimated using the expectation maximization algorithm to iteratively improve the likelihood of the observed speech Y given the models $\Lambda_x$. The stochastic matching algorithm operates only on the given test utterance and the given set of speech models. No training is required for the estimation of the mismatch prior to the actual testing. The mappings described in U.S. Pat. No. 5,727,124 are hereby included by reference.

Both methods may also be combined, where the representation Y of the distorted input signal is mapped to an estimate of an original representation X and the original models $\Lambda_x$ are mapped to transformed models which better match the estimated representation X. The methods may be used in an iterative manner where the transformed signal and/or the transformed models replace the respective original input signal and/or models. In this way the input signal and models are iteratively transformed to obtain a statistical closer match between the input signal and the models. In this process a relatively noisy input signal may get transformed to a cleaner input signal, whereas relatively clean models might get transformed to more noisy models.

For recognition, models are usually trained under the best (clean) conditions in order to obtain optimal recognition. In the known method, the models are transformed based on the distorted input signal. This degrades the performance, particularly for low SNR ratios, making it difficult to obtain the optimal performance which could be achieved with the original models. Moreover, if the mismatch between the original models and the input signal is significant, the risk of transforming the signal and/or models in a wrong direction increases (albeit that they statistically may come closer). This is for instance the case if the input signal has a low signal to noise ratio, making it difficult to reliably estimate the original signal.

SUMMARY OF THE INVENTION

It is an object of the invention to provide a speech processing method and speech processing system capable of improved speech processing particularly under adverse conditions.

To achieve the object of the invention, the method of processing a degraded speech input signal includes:

receiving the degraded speech input signal;

estimating a condition, such as the signal-to-noise ratio or bandwidth, of the received input signal;

selecting a processing model corresponding to the estimated signal condition;

estimating an originally uttered speech signal based on the received input signal;

processing the estimated original signal according to the selected model; and outputting a processing result.

In the method according to the invention, starting from an initial estimate of a condition of the signal (e.g. SNR or bandwidth), a processing model is selected, where the new model is a function of the estimated signal condition. Preferably, a model is selected which was optimally trained for the signal condition. Also an estimate is made of the originally uttered speech. By both selecting an appropriate model and estimating the original speech, the processing accuracy improves in a "push-pull" manner. In the known system, the current model is transformed to a new one, where the transformation is a function of the input signal $Y(\Lambda_y = G_\eta(\Lambda_x))$. In the method according to the invention, no model transformation takes place, avoiding degradation of the model. Instead a model matching the estimated signal condition is used.

As described in one embodiment of the invention, the estimate of the originally uttered speech is based on a predetermined processing model $\Lambda_x$. Preferably, the estimate is based on a Maximum Likelihood Estimation (MLE). For instance, the MLE approach of U.S. Pat. No. 5,727,124 may be used, wherein the estimated original speech $\hat{X}$ is given by: $\hat{X}=F_v(Y)$, where the parameters v are given by: $v = \underset{v}{\operatorname{argmax}} P\{\hat{X}, v \mid S, \Lambda_x\}.$ As described in another embodiment of the invention, the processing model used for estimating the original speech is the model $\Lambda_x(\xi)$ selected to match the estimated signal condition $\xi$. In this way the accuracy of estimating the original signal is increased.

As described in still another embodiment of the invention, an iterative procedure is used, wherein in each iteration, the signal condition is re-estimated, a new model is selected based on the new signal condition, and a new estimate is made of the original speech (using the then selected model). The model which was selected first acts as a discrimination seed for the further bootstrap operations. The iteration stops when a criterion is met (e.g. the recognition with the then selected model is adequate or no longer improves (e.g. gets worse) compared to a likelihood obtained by a previous recognition). The iteration process may start with a conservative estimate of the degradation of the signal (e.g. a relatively high SNR), where in each iteration the signal condition is degraded (e.g. a lower SNR is selected).

To meet the object of the invention, the speech processing system for processing a degraded speech input signal includes:

an input receiving the degraded speech input signal;
means for estimating a condition, such as the signal-to-noise ratio or bandwidth, of the received input signal;
means for selecting a processing model corresponding to the estimated signal condition;
means for estimating an originally uttered speech signal based on the received input signal;
means for processing the estimated original signal according to the selected model; and
an output for outputting a processing result.

BRIEF DESCRIPTION OF THE DRAWINGS

These and other aspects of the invention will be apparent from and elucidated with reference to the embodiments shown in the drawings.

DETAILED DESCRIPTION OF THE INVENTION

General description of a speech recognition system.

Figure 1:
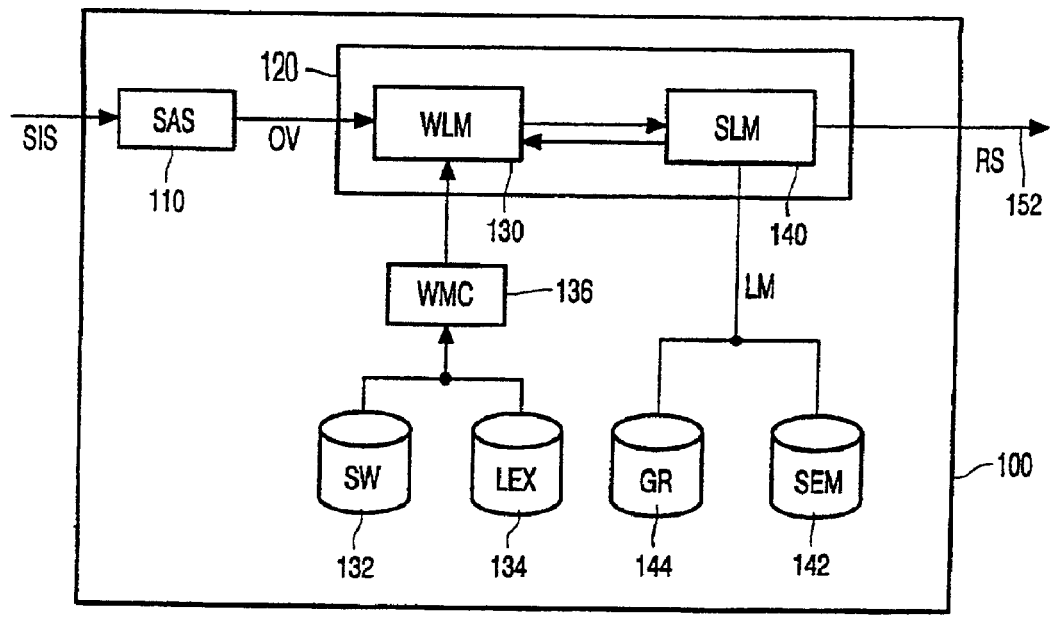
FIG. 1 shows a block diagram of a conventional speech processing system wherein the invention can be used.

Speech recognition systems, such as large vocabulary continuous speech recognition systems, typically use a collection of recognition models to recognize an input pattern. For instance, an acoustic model and a vocabulary may be used to recognize words and a language model may be used to improve the basic recognition result. FIG. 1 illustrates a typical structure of a large vocabulary continuous speech recognition system 100 [refer L. Rabiner, B-H. Juang, "Fundamentals of speech recognition", Prentice Hall 1993, pages 434 to 454]. The following definitions are used for describing the system and recognition method:

$\Lambda_x$: a set of trained speech models
X: the original speech which matches the model, $\Lambda_x$
Y: the testing speech
$\Lambda_y$: the matched models for testing environment.
W. the word sequence.
S: the decoded sequences that can be words, syllables, sub-word units, states or mixture components, or other suitable representations.

The system 100 comprises a spectral analysis subsystem 110 and a unit matching subsystem 120. In the spectral analysis subsystem 110 the speech input signal (SIS) is spectrally and/or temporally analyzed to calculate a representative vector of features (observation vector, OV). Typically, the speech signal is digitized (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. The standard approach to large vocabulary continuous speech recognition is to assume a probabilistic model of speech production, whereby a specified word sequence $W=w_1w_2w_3 \ldots w_q$ produces a sequence of acoustic observation vectors $Y=y_1y_2y_3 \ldots y_T$. The recognition error can be statistically minimized by determining the sequence of words $w_1w_2w_3 \ldots w_q$ which most probably caused the observed sequence of observation vectors $y_1y_2y_3 \ldots y_T$ (over time $t=1, \ldots, T$), where the observation vectors are the outcome of the spectral analysis subsystem 110. This results in determining the maximum a posteriori probability:

max $P(W|Y, \Lambda_x)$, for all possible word sequences W

By applying Bayes' theorem on conditional probabilities, $P(W|Y, \Lambda_x)$ is given by:

$$P(W | Y, \Lambda_x) = \frac{P(Y | W, \Lambda_x) \cdot P(W)}{P(Y)}$$

Since P(Y) is independent of W, the most probable word sequence is given by:

$$\hat{W} = \underset{W}{\operatorname{argmax}} \, P(Y, W | \Lambda_x) = \underset{W}{\operatorname{argmax}} \, P(Y, W | \Lambda_x) \cdot P(W) \qquad (1)$$

In the unit matching subsystem 120, an acoustic model provides the first term of equation (1). The acoustic model is used to estimate the probability P(Y|W) of a sequence of observation vectors Y for a given word string W. For a large vocabulary system, this is usually performed by matching the observation vectors against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. In most small vocabulary speech recognition systems, a whole word is represented by a speech recognition unit, in which case a direct relationship exists between the word model and the speech recognition unit. In other small vocabulary systems, for instance used for recognizing a relatively large number of words (e.g. several hundreds), or in large vocabulary systems, use can be made of linguistically based sub-word units, such as phones, diphones or syllables, as well as derivative units, such as fenenes and fenones. For such systems, a word model is given by a lexicon 134, describing the sequence of sub-word units relating to a word of the vocabulary, and the sub-word models 132, describing sequences of acoustic references of the involved speech recognition unit. A word model composer 136 composes the word model based on the subword model 132 and the lexicon 134.

Figure 2A:
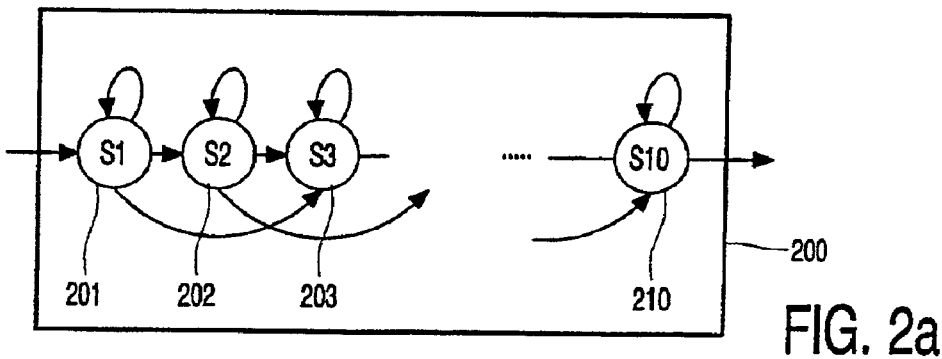
FIG. 2 illustrates conventional word models used in speech processing.
Figure 2B:
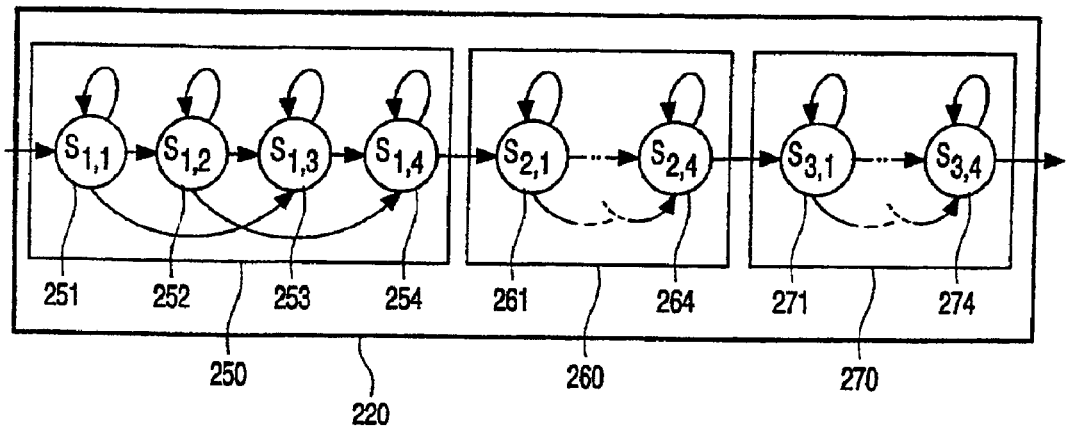

FIG. 2A illustrates a word model 200 for a system based on whole-word speech recognition units, where the speech recognition unit of the shown word is modeled using a sequence of ten acoustic references (201 to 210). FIG. 2B illustrates a word model 220 for a system based on sub-word units, where the shown word is modeled by a sequence of three sub-word models (250, 260 and 270), each with a sequence of four acoustic references (251, 252, 253, 254; 261 to 264; 271 to 274). The word models shown in FIG. 2 are based on Hidden Markov Models (HMMs), which are widely used to stochastically model speech signals. Using this model, each recognition unit (word model or subword model) is typically characterized by an HMM, whose parameters are estimated from a training set of data. For large vocabulary speech recognition systems usually a limited set of, for instance 40, sub-word units is used, since it would require a lot of training data to adequately train an HMM for larger units. An HMM state corresponds to an acoustic reference. Various techniques are known for modeling a reference, including discrete or continuous probability densities. Each sequence of acoustic references which relate to one specific utterance is also referred as an acoustic transcription of the utterance. It will be appreciated that if other recognition techniques than HMMs are used, details of the acoustic transcription will be different.

A word level matching system 130 of FIG. 1 matches the observation vectors against all sequences of speech recognition units and provides the likelihoods of a match between the vector and a sequence. If sub-word units are used, constraints can be placed on the matching by using the lexicon 134 to limit the possible sequence of sub-word units to sequences in the lexicon 134. This reduces the outcome to possible sequences of words.

Furthermore a sentence level matching system 140 may be used which, based on a language model (LM), places ether constraints on the matching so that the paths investigated are those corresponding to word sequences which are proper sequences as specified by the language model. As such the language model provides the second term P(W) of equation (1). Combining the results of the acoustic model with those of the language model, results in an outcome of the unit matching subsystem 120 which is a recognized sentence (RS) 152. The language model used in pattern recognition may include syntactical and/or semantical constraints 142 of the language and the recognition task. A language model based on syntactical constraints is usually referred to as a grammar 144. The grammar 144 used by the language model provides the probability of a word sequence $W=w_1w_2w_3 \ldots w_q$, which in principle is given by:

$$P(W)=P(w_1)P(w_2|w_1).P(w_3|w_1w_2) \ldots P(w_q|w_1w_2w_3 \ldots w_q).$$

Since in practice it is infeasible to reliably estimate the conditional word probabilities for all words and all sequence lengths in a given language, N-gram word models are widely used. In an N-gram model, the term P(wj| w1w2w3 . . . wj−1) is approximated by P(wj| wj−N+1 . . . wj−1). In practice, bigrams or trigrams are used. In a trigram, the term P(wj| w1w2w3 . . . wj−1) is approximated by P(wj| wj−2wj−1).

The speech processing system according to the invention may be implemented using conventional hardware. For instance, a speech recognition system may be implemented on a computer, such as a PC, where the speech input is received via a microphone and digitized by a conventional audio interface card. All additional processing takes place in the form of software procedures executed by the CPU. In particular, the speech may be received via a telephone connection, e.g. using a conventional modem in the computer. The speech processing may also be performed using dedicated hardware, e.g. built around a DSP.

DETAILED DESCRIPTION OF THE INVENTION

According to the invention, a matching algorithm is used to overcome the matched performances for robust speech recognition. Preferably, the algorithm is used in an iterative manner, and the matching is based on a stochastic matching: the Successive Stochastic Matching (SSM) algorithm. The algorithm may in principle be used to deal with any degraded signal condition. In particular, two parametric forms are described. The first one is called "SNR-incremental stochastic matching (SISM)" for noisy speech recognition, where SNR denotes signal-to-noise ratio; the second one is called "bandwidth-incremental stochastic matching (BISM)" to improve the recognition accuracy of narrow-band speech and to approach the performances of the speech models trained from high quality microphone speech. Both forms of the algorithms may also be combined. The algorithm is specifically suitable for telephone speech recognition. However, it may also be used, for instance, for speech recognition where a microphone is directly connected to a processing unit, such as a PC, although in this case the signal condition is in general better, so that less improvement can be achieved. In the algorithm according to the invention, a bootstrapped and, preferably, well-retrained model which has good discrimination characteristics is used to improve the recognition, the bootstrap operation. This is preferably repeated during each iteration. Besides speech recognition, the algorithm can also be used for speech coding (particularly for transfer via a telephone system). For this application, bootstrap codebooks/encoders are used instead of bootstrap models/recognisers, i.e. $\Lambda_x(\xi)$ denotes the bootstrap codebooks for coding instead of a speech recognition model.

Figure 3:
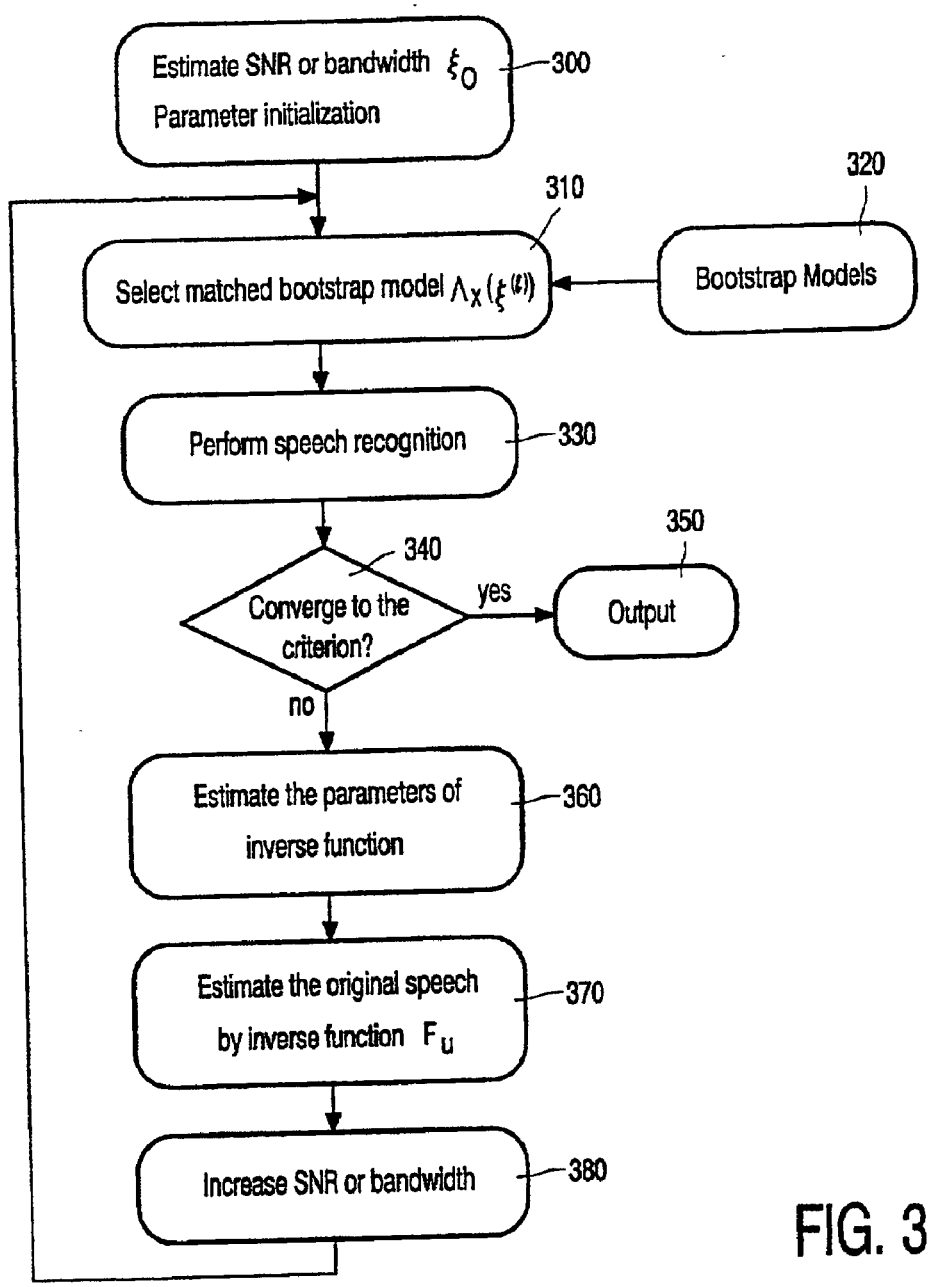
FIG. 3 illustrates an iterative embodiment of the method according to the invention.

The iterative version of the algorithm is as follows and as illustrated in FIG. 3:

Initialization:

Step 300:  Initialise parameters:
l = 0, where l denotes the iteration number,
$v^{(l)} = v_0$, where v is the parameter set of the inverse function $F_v$, and $\hat{X}^{(l)} = Y$, where Y is the received input speech (the testing speech), and $\hat{X}$ is an estimate of the originally uttered speech; and
Estimate an initial signal condition $\xi^{(l)}$ ($\xi$ represents the signal condition, like the SNR or bandwidth)

Recursion:

Step 310:  Select a matched bootstrap model $\Lambda_x(\xi^{(l)})$, e.g. from a set of stored models 320

Step 330:  Recognize the speech:

$$S^{(l)} = \arg\max_{s} P\{\hat{X}^{(l)}, S \mid v^{(l)}, \Lambda_x(\xi^{(l)})\}$$

Step 340:  Check a predetermined stop criterion. If the criterion is met, then STOP and OUTPUT S (350)

Step 360:  Estimate v:

$$v^{(l+1)} = \arg\max_{v} P\{\hat{X}^{(l)}, v \mid S^{(l)}, \Lambda_x(\xi^{(l)})\}$$

Step 370:  Estimate the original speech: $\hat{X}^{(l+1)} = F_{v^{(l+1)}}(\hat{X}^{(l)})$
Step 380:  Increase the estimate of the signal condition:
$\xi^{(l+1)} = \xi^{(l)} + \delta, (\delta > 0)$
Reiterate:  l ← l + 1 and go to step 310

In step 310, a bootstrap model is selected matching the signal condition $\xi^{(l)}$. Preferably, the system comprises several models each optimised for a different signal condition. The selection then simply involves loading the model associated with the signal condition $\xi^{(I)}$. Such a set of models can be created from the same original 'clean' speech recording. For instance, for the SISM algorithm white Gaussian-noise may be added to the clean speech to contaminate the signal to a desired SNR, followed by training a recognition model from the contaminated speech signals. The model is then stored in association with the SNR ($\xi$). This can be done for several SNRs, resulting in a set of retrained models. Of course, also recordings of speech may be made under various signal conditions, where the models are then created from the original recording instead of from contaminated recordings.

In step 340, for speech recognition preferably the stop criterion is based on the recognition result with the current model. If the recognition result is sufficient (e.g. based on confidence measures) or the likelihood does not increase anymore, the iteration may be stopped.

It will be appreciated that instep 360 and 370, an estimate of the original speech is based on the inverse function $F_y$. In principle, also other suitable methods may be used to map the current speech signal to an improved estimate, preferably using the currently selected model $\Lambda_x(\xi)$.

In a non-iterative version of the algorithm, it is sufficient to only once perform step 370. This may for instance be achieved by executing the following sequence: steps 300, 310, 360, 370, 380, 310, and 330, followed by outputting the recognition result (step 350).

General Properties:

1. $P\{Y(\xi')|\Lambda_x(\xi')\} \geq P\{Y(\xi)|\Lambda_x(\xi)\}$ for $\xi' \geq \xi$, where $\xi$ and $\xi'$ denote the signal condition (e.g. SNR or bandwidth) and $Y(\xi)$ denotes the testing speech at signal condition $\xi$. This property implies that the matched performance of, for instance, high SNR or wide bandwidth is better than the one of low SNR or narrow bandwidth.
2. $P\{Y(\xi)|\Lambda_x(\xi)\} \geq P\{Y(\xi)|\Lambda_x(\xi')\}$ for $\xi' \neq \xi$, where $\xi$ and $\xi'$ denote SNR only in this property.

SSM's Properties:

1. According to above two properties, the local maximum of P will be located at the $\hat{\xi}, \hat{\xi} \in [\xi^{(0)}, \xi^{(0)} + \Theta], \Theta > 0$. It means that overcoming the matched performances is possible.
2. The decoded sequence, $S = \{S_i, 1 \leq i \leq T\}$, can be expected to be optimal solution in each recursive step by automatically selecting the matched bootstrap model.
3. The models $\Lambda_x(\xi)$ which are well trained in different signal conditions (different SNRs for SISM or different bandwidths for BISM) are the bootstrap models for gaining the discrimination.

The initial joint bootstrap operation is a core feature in the SSM algorithm. In the initial step, a matched model is selected as a discrimination seed for further bootstrap operations. It is an optimal initialization with the most discrimination power. It means that the seed can get the least mismatch between model and input signal based on the sense of maximum likelihood estimation. In a bootstrap step, the model is varied by the function of signal condition, like SNR or bandwidth, i.e. $\Lambda_x(\xi)$, and the testing speech is also updated to an estimate of the original speech (e.g. by the inverse function, $F_y$). It implies "push-pull" to the recognition performances of higher SNR for SISM or wider bandwidth for BISM. Preferably, the bootstrap operation is performed in an iterative manner. In this way, the signal condition can be improved successively (e.g. increasing the SNR or bandwidth) for the mutual optimisation of features and models.

Figure 4:
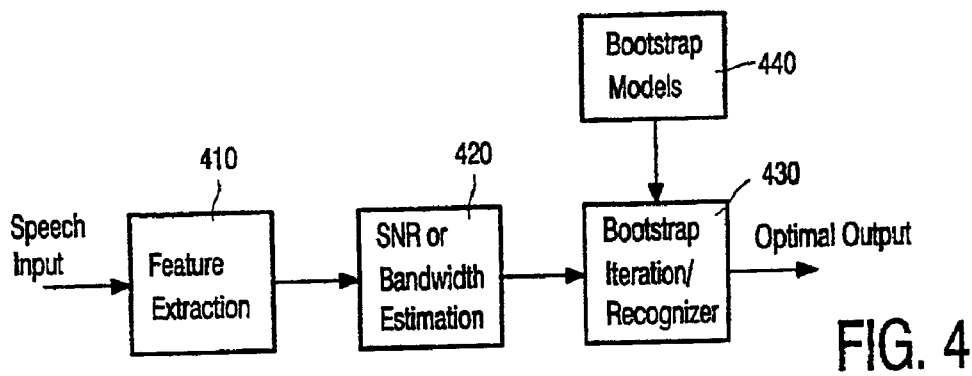
FIG. 4 shows a block diagram of a speech processing system according to the invention.

In the SSM algorithm, in step 300 an initial estimate is made of the signal condition (SNR for SISM or bandwidth for BISM) in order to select a matched bootstrap model as discrimination seed. The initial estimate may be based on typical conditions for a specific application. Also a (simple) test of the signal may be done. The optimal state/mixture sequence can be obtained via matched bootstrap models in each recursive step. An exemplary block diagram of a speech recognition system using the SSM algorithm is shown in FIG. 4. In block 410 features are extracted from the received speech signal. This may be done in a manner described for the spectral analysis subsystem 110 of FIG. 1. In block 420, an estimate is made of the signal condition. This may be based on measuring/estimating such a condition in a known way, or may simply be a conservative estimate (only a moderate degradation as typically exists minimally for the given application). In block 430, the speech is processed in the normal way (e.g. in a manner described for the unit matching subsystem 120 of FIG. 1), where according to the invention a bootstrap model matching the estimated signal condition is obtained from a storage 440 which comprises a set of models for different signal conditions. As described for FIG. 3, the processing is also changed in that an estimate is made of the original speech input. Moreover, the iterative procedure of FIG. 3 may be followed.

Figure 5:
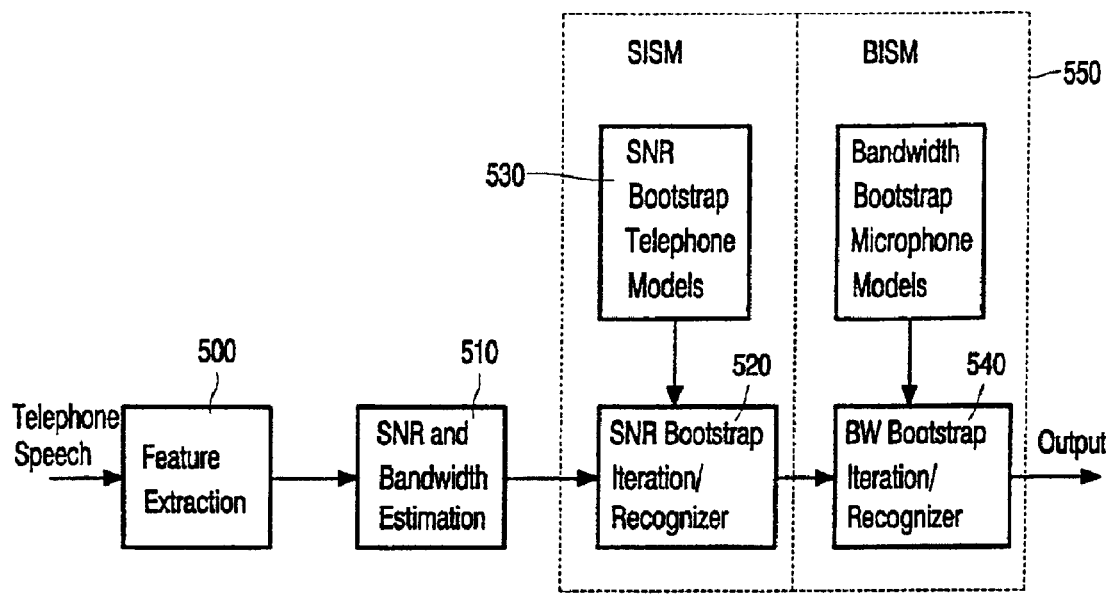
FIG. 5 shows a block diagram of a speech processing system wherein the method according to the invention is exploited twice, to overcome SNR and bandwidth degradation.

The BISM can be applied to narrow-band speech recognition using bandwidth incremental approach in order to obtain the accuracy of high quality models trained from microphone speech. It is well known that the performance of telephone speech is worse than microphone speech even at noise-free condition. The BISM can break through the traditional performance of telephone speech recognition accuracy. Advantageously, the SISM and BISM algorithms are combined for noisy narrow-band speech recognition. FIG. 5 shows a block diagram of a speech recognition system using both algorithms. In this embodiment, which is for instance suitable for recognition of noisy telephone speech, the SISM and BISM algorithms are cascaded to remove the noise effects using telephone bootstrap models and to approach the performance of high quality microphone models using microphone bootstrap models. In block 500 features are extracted from the received speech signal. This may be done in a manner described for the spectral analysis subsystem 110 of FIG. 1. In block 510, an estimate is made of two signal conditions. In the example, an estimate is made of the SNR and of the signal bandwidth. The estimate may be based on measuring/estimating such a condition in a known way, or may simply be a conservative estimate (only a moderate degradation as typically exists minimally for the given application). In block 520, the speech is processed in the normal way (e.g. in a manner described for the unit matching subsystem 120 of FIG. 1), where according to the invention a bootstrap model matching the estimated signal condition is obtained from a storage 530 which comprises a set of models for different signal conditions. In the shown example, the bootstrap models are optimised for different SNRs of the input signal. As described for FIG. 3, the processing is also changed in that an estimate is made of the original speech input. Moreover, the iterative procedure of FIG. 3 may be followed. In this way suitable model(s) for processing at this SNR are located and the input signal is transformed to an estimated original signal, assuming this SNR. Following this, a same procedure is used in block 540 for the bandwidth, where the models for the various bandwidths are retrieved from a storage 550. In the example, it is also possible to integrate the storages 530 and 550. For instance, for each supported SNR level a set of models may be stored, each having a different bandwidth. This enables a simple procedure for performing both optimisations. For instance, assuming a default or estimated bandwidth, first the most appropriate model for the SNR is determined, preferably in an iterative manner. This results in identifying a set of models for that SNR, where the models differ in bandwidth. In a next process, then the model best matching the bandwidth is selected from that set of models. It will be appreciated that instead of cascading the two processing steps also an integrated procedure can be made.

The SSM algorithm can be applied to robust speech coding by using bootstrap codebooks/encoder instead of bootstrap models/recogniser, i.e. $\Lambda_x(\xi)$ denotes the bootstrap codebooks. The SISM algorithm can improve the quality of microphone or telephone speech coding to high SNR level in adverse environments. And, the BISM algorithm even can improve the telephone speech coding to microphone (or wider bandwidth) quality. It means that it is possible to transmit the coded speech with microphone quality through telephone networks by using the BISM algorithm for telephone speech coding because the telephone speech can be decoded by using microphone codebooks. The implementation of SSM for speech coding is similar to that one described for recognition by replacing the bootstrap models by bootstrap codebooks. The block diagram of FIG. 5 also applies to noisy telephone speech coding. The output is the codebook entry.

Preferably, a divergence-based model separation method is used for the discriminative training of the bootstrap model in SSM algorithm. To implement the SSM algorithm, the bootstrap model will be adapted from clean one instead of retraining from noisy data because it is not easy to collect enough noisy speech data in advance. The preferred method is based on a divergence-based misclassification function, where the relative divergence is derived from Kullback-Leibler (KL) information. The KL information (or KL divergence) of a distribution $q(x)$ with respect to another distribution $p(x)$ has been well defined as:

$$D_{KL}(p, q) = E_p\left\{\log\left(\frac{p(x)}{q(x)}\right)\right\} = \sum_{x \in \chi} p(x) \log\left(\frac{p(x)}{q(x)}\right)$$

The KL information is greater than or equal to zero, and $D_{KL}(p,q)=0$ when the two distributions are identical. If p and q are single Gaussian distributions, the above expression has a closed form $$D_{KL}(p, q) = \frac{1}{2}\left\{\log\left(\frac{\sigma_q^2}{\sigma_p^2}\right) + \frac{(\mu_p - \mu_q)^2}{\sigma_q^2} + \left(\frac{\sigma_p^2}{\sigma_q^2} - 1\right)\right\}$$

where $\mu_p$ and $\mu_q$ are the means of the p and q distributions, and $\sigma_p^2$ and $\sigma_q^2$ are the respective variances. For a continuous density HMM (CDHMM), the mixture Gaussian density is widely used for state observation probability density function (pdf). Thus, an averaged KL information between the states is defined $$\overline{D}_{KL}(P, Q) = \frac{1}{M_p M_q} \sum_{j_p=1}^{M_p} \sum_{j_q=1}^{M_q} \sum_{d=1}^{D} D_{KL}(p_{j_p,d}, q_{j_q,d})$$

where $M_p$ and $M_q$ are the mixture numbers of the state P and Q. Next, we formulate a divergence-based misclassification function to measure how "close" between two CDHMMs.

$$R_{KL}(\Lambda_1, \Lambda_2) = \frac{1}{N} \sum_{i=0}^{N-1} \left\{ \overline{D}_{KL}(s_{i,\Lambda_1}, s_{i,\Lambda_2}) - \left[\frac{1}{N-1} \sum_{k, k \neq i} \{\overline{D}_{KL}(s_{i,\Lambda_1}, s_{k,\Lambda_2})\}^{-\zeta}\right]^{-\frac{1}{\zeta}} \right\}$$

N is the number of state of the models and $s_{i,\Lambda}$ denotes the ith state of the models $\Lambda$. Note that the KL information is not symmetric. So, we define a symmetrical relative divergence between two models as follows.

$$\overline{R}_{KL}(\Lambda_1, \Lambda_2) = \frac{1}{2}[R_{KL}(\Lambda_1, \Lambda_2) + R_{KL}(\Lambda_2, \Lambda_1)]$$

The relative divergence, $\overline{R}_{KL}(\Lambda_1, \Lambda_2)$, is to measure the difference between intra-state and inter-state distances for two models, $\Lambda_1$ and $\Lambda_2$. The smaller relative divergence is, the closer the two models are.

The loss function can then be defined as:

$$l(\Lambda_1, \Lambda_2) = \frac{1}{1 + \exp(-\gamma \overline{R}_{KL}(\Lambda_1, \Lambda_2) + \theta)}$$

and, $$\Lambda^{(n+1)} = \Lambda^{(n)} - \epsilon U_n \nabla l(\Lambda^{(n)}, \Lambda^{(n)})$$

There are two applications for discriminative training of bootstrap models. $\Lambda_1 = \Lambda_2 = \Lambda$: This application is for discrimination improvement of models, where the model parameters are adjusted in the model-space based on minimum relative divergence. It also implies the minimum error rate. The model parameters can be adaptively tuned by $$\Lambda^{(n+1)} = \Lambda^{(n)} - \epsilon U_n \nabla l(\Lambda^{(n)}, \Lambda^{(n)})$$

where n is the iteration and $U_n$ is a positive definite matrix. $\Lambda_1 \neq \Lambda_2$: This approach is called discrimination adaptation. Assume that the discriminative power of the model $\Lambda_2$ is better than that of $\Lambda_1$, for example, different SNR levels. We can do the adaptation to improve the discriminative power of $\Lambda_1$ towards to that of $\Lambda_2$ by $$\Lambda_1^{(n+1)} = \Lambda_1^{(n)} - \epsilon U_n \nabla l(\Lambda_1^{(n)}, \Lambda_2)$$

Detailed equations of divergence-based model separation method:

The discriminative adjustment of the mean vector follows $$\mu_{ijd,\Lambda_1}^{(n+1)} = \mu_{ijd,\Lambda_1}^{(n)} - \varepsilon \frac{\partial l(\Lambda_1^{(n)}, \Lambda_2)}{\partial \mu_{ijd,\Lambda_1}} \quad (1)$$

where $$\frac{\partial l(\Lambda_1^{(n)}, \Lambda_2)}{\partial \mu_{ijd,\Lambda_1}} = \frac{\partial l(\Lambda_1^{(n)}, \Lambda_2)}{\partial \overline{R}_{KL}(\Lambda_1^{(n)}, \Lambda_2)} \frac{\partial \overline{R}_{KL}(\Lambda_1^{(n)}, \Lambda_2)}{\partial \mu_{ijd,\Lambda_1}} \quad (2)$$

$$\frac{\partial l(\Lambda_1^{(n)}, \Lambda_2)}{\partial \overline{R}_{KL}(\Lambda_1^{(n)}, \Lambda_2)} = \gamma l(\Lambda_1^{(n)}, \Lambda_2)(1 - l(\Lambda_1^{(n)}, \Lambda_2)) \quad (3)$$

-continued $$\frac{\partial \bar{R}_{KL}(\Lambda_1^{(n)}, \Lambda_2)}{\partial \mu_{ijd,\Lambda_1}} = \frac{1}{2M_{i,\Lambda_1}} \left( \sum_{m=1}^{M_{i,\Lambda_1}} \left( \frac{\mu_{ijd,\Lambda_1} - \mu_{imd,\Lambda_1}}{\sigma_{imd,\Lambda_1}^2} \right) \right) - \quad (4)$$

$$\frac{1}{2M_{k_1,\Lambda_2}} \left( \sum_{m=1}^{M_{k_1,\Lambda_2}} \left( \frac{\mu_{ijd,\Lambda_1} - \mu_{k_1,md,\Lambda_2}}{\sigma_{k_1,md,\Lambda_2}^2} \right) \right) +$$

$$\frac{1}{2M_{i,\Lambda_1}} \left( \sum_{m=1}^{M_{i,\Lambda_1}} \left( \frac{\mu_{ijd,\Lambda_1} - \mu_{imd,\Lambda_1}}{\sigma_{imd,\Lambda_1}^2} \right) \right) -$$

$$\frac{1}{2M_{k_2,\Lambda_2}} \left( \sum_{m=1}^{M_{k_2,\Lambda_2}} \left( \frac{\mu_{ijd,\Lambda_1} - \mu_{k_2,md,\Lambda_2}}{\sigma_{ijd,\Lambda_1}^2} \right) \right)$$

And, the adjustment of standard deviation follows $$\sigma_{ijd,\Lambda_1}^{(n+1)} = \sigma_{ijd,\Lambda_1}^{(n)} - \varepsilon \frac{\partial l(\Lambda_1^{(n)}, \Lambda_2)}{\partial \sigma_{ijd,\Lambda_1}} \quad (5)$$

where $$\frac{\partial l(\Lambda_1^{(n)}, \Lambda_2)}{\sigma_{ijd,\Lambda_1}} = \frac{\partial l(\Lambda_1^{(n)}, \Lambda_2)}{\partial \bar{R}_{KL}(\Lambda_1^{(n)}, \Lambda_2)} \frac{\partial \bar{R}_{KL}(\Lambda_1^{(n)}, \Lambda_2)}{\partial \sigma_{ijd,\Lambda_1}} \quad (6)$$

$$\frac{\partial \bar{R}_{KL}(\Lambda_1^{(n)}, \Lambda_2)}{\partial \sigma_{ijd,\Lambda_1}} = \frac{1}{2M_{i,\Lambda_1}} \left( \sum_{m=1}^{M_{i,\Lambda_1}} \left( \frac{\sigma_{ijd,\Lambda_1}}{\sigma_{imd,\Lambda_1}^2} \right) \right) - \quad (7)$$

$$\frac{1}{2M_{k_1,\Lambda_2}} \left( \sum_{m=1}^{M_{k_1,\Lambda_2}} \left( \frac{\sigma_{ijd,\Lambda_1}}{\sigma_{k_1,md,\Lambda_2}^2} \right) \right) +$$

$$\frac{1}{2M_{i,\Lambda_1}} \left( \sum_{m=1}^{M_{i,\Lambda_1}} \left( \frac{(\mu_{imd,\Lambda_1} - \mu_{ijd,\Lambda_1})^2 + \sigma_{imd,\Lambda_1}^2}{\sigma_{ijd,\Lambda_1}^3} \right) \right) -$$

$$\frac{1}{2M_{k_2,\Lambda_2}} \left( \sum_{m=1}^{M_{k_2,\Lambda_2}} \left( \frac{(\mu_{k_2md,\Lambda_2} - \mu_{ijd,\Lambda_1})^2 + \sigma_{k_2md,\Lambda_2}^2}{\sigma_{ijd,\Lambda_1}^3} \right) \right)$$

and, $$k_1 = \underset{k, k \in \Lambda_2}{\operatorname{argmin}} \bar{D}_{KL}(s_{i,\Lambda_1}, s_{k,\Lambda_2}) \text{ and } k_2 = \underset{k, k \in \Lambda_2}{\operatorname{argmin}} \bar{D}_{KL}(s_{k,\Lambda_2}, s_{i,\Lambda_1}) \quad (8)$$

where $M_{i,\Lambda}$ denotes the mixture number of ith state of model $\Lambda$, $\mu_{ijd,\Lambda}$ and $\sigma_{ijd,\Lambda}$ denote the standard deviation of dth order, jth mixture density, and ith state of model $\Lambda$, respectively.

Results:

Experiments were performed to evaluate the principal performance boundaries of adapted and retrained models under added noise conditions. Adapted models fully alter the parameters of Hidden Markov Models (HMM) from clean ones in order to match the noisy test environment. Retrained models are fully trained from white Gaussian-noise contaminated speech at matched signal-to-noise ratio (SNR) environments. As described above, such retrained models can be used in the SIMD algorithm. The capabilities and limitations of adapted models and retrained models have been studied. The results show that the concept of using retrained models according to the invention provides a better performance than using adapted models. This holds for any conditions but especially for low SNRs. The results show that phone error rates for retrained models are about 6% better than for adapted models. It has also been found that the retrained models improve the word error rate by 6% for 15-dB SNR and even by 18% for 0-dB SNR. Details are provided below.

The model retraining technique has been compared to the known technique of model adaptation/transformation. In this known technique, the models are adapted onto the test environments. The resulting performance depends on the state-to-frame alignment and is often bounded by the performance in matched conditions. Maximum likelihood linear regression (MLLR) is used to adapt the models into new environments. Stochastic matching (SM) modifies features or models in order to match the environmental change.

The principal limitations of algorithms for model adaptation/transformation has been studied by using fully adapted models as has been described above for U.S. Pat. No. 5,727,124 and retrained models according to the invention. The fully adapted model is used to simulate that the added noise can be estimated accurately for model re-estimation. The experimental set-up of the fully adapted models is as follows:

Step 1: The clean speech of training corpus is segmented by means of clean models, and the paths are kept for noisy model training.

Step 2: Different levels of added noise are added into the test utterances. All HMM parameters are re-estimated without any further iteration.

The retrained models are fully trained from noisy speech at matched SNR environments like the training of clean models. White Gaussian noise was added to the testing utterances at different total SNR levels. The total SNR is defined as follows, where $\sigma_x^2$ is the variance of testing speech utterance and $\sigma_n^2$ is the variance of added noise.

$$TotalSNR = 10\log_{10}\left(\frac{\sigma_x^2}{\sigma_n^2}\right)_{(dB)}$$

Experiments were performed on the "Japanese Electronic Industry Development Association's Common Speech Data Corpus" (JSDC) being mainly an isolated-phrase corpus. The JSDC corpus was recorded with dynamic microphones and sampled at 16 kHz. The phonetically rich JSDC cityname subcorpus was used to train phone-based HMMs. In the experiments 35 monophone HMMs were deployed with three states per model and nominal 32 Laplacian mixture densities per state. The JSDC control-word corpus with a vocabulary of 63 words was used as testing material.

Figure 6:
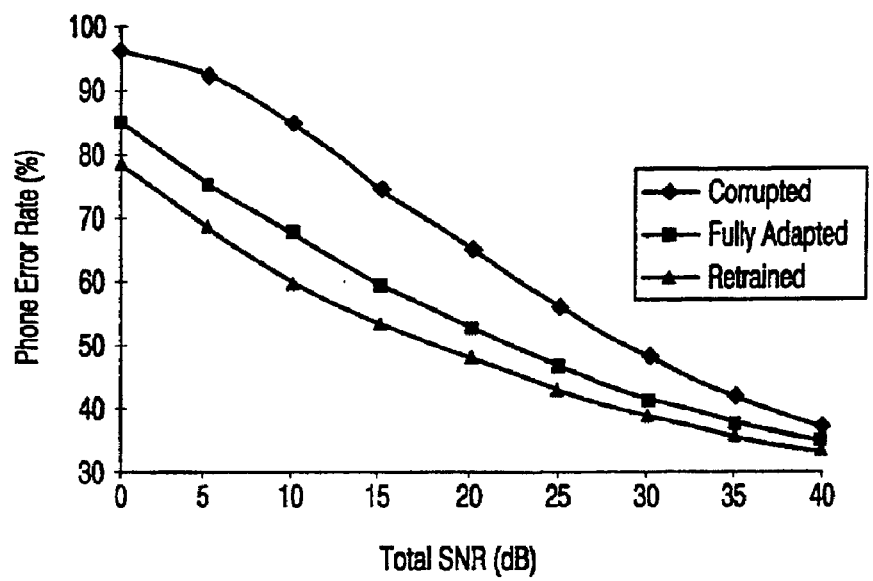
FIGS. 6, 7, and 8 illustrate results obtained with the method and system according to the invention.
Figure 7:
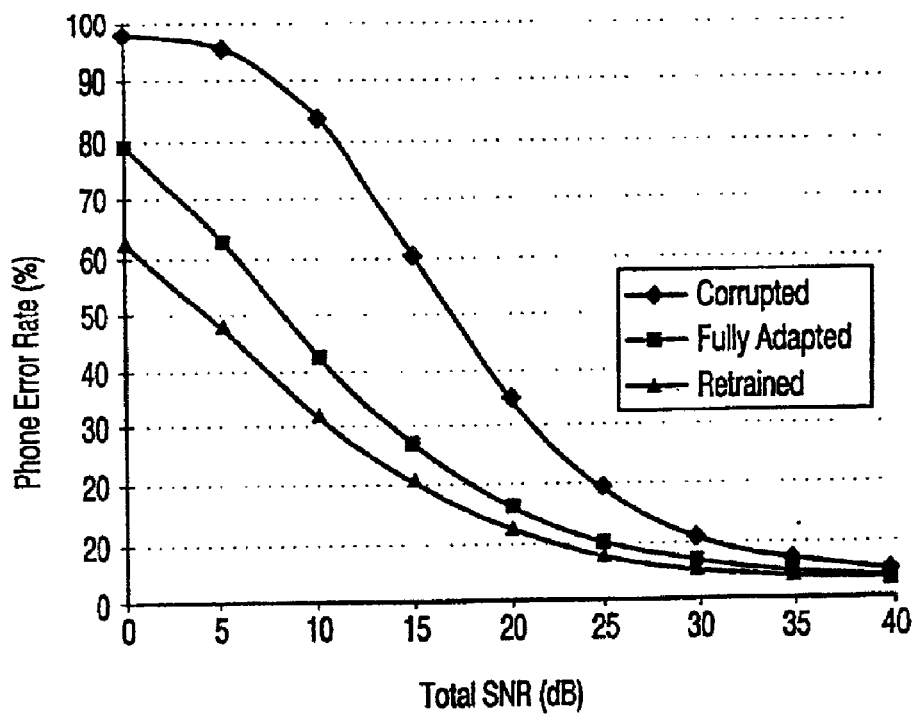

Experiments for free-phone decoding and word recognition were performed. The resulting phone and word error rates are shown in FIG. 6 and FIG. 7, respectively. Horizontally, the SNR is shown in dB. Vertically the respective error rates are shown (in percentages). The following curves are shown:

1. Corrupted performance: The models are clean and the test material is corrupted by added white Gaussian noise, where clean means there is no noise added.
2. Fully adapted performance: The models are adapted from clean ones based on known noise levels and the test material is corrupted at the same SNR levels.
3. Retrained performance: The models are fully retrained in known SNR environments and the test material is corrupted at the same SNR levels.

It has been found that retrained models perform always better than adapted models under any condition but especially at low SNR levels. FIG. 6 shows that phone error rates for retrained models are about 6% better than for adapted models. From FIG. 7, it also can be seen that retrained models improve the word error rate by 6% of for 15-dB SNR and even by 18% for 0-dB SNR.

Figure 8:
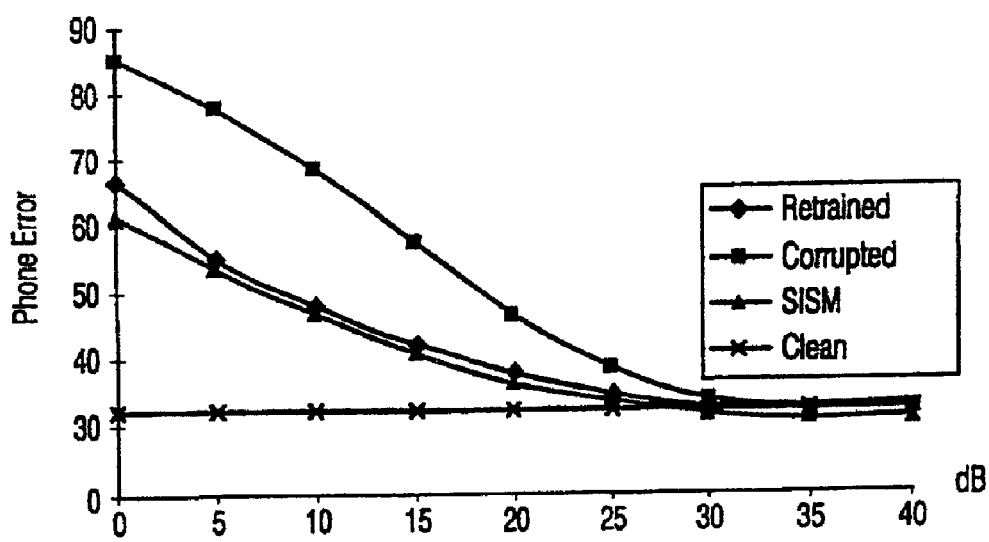

Further experiments were carried out on JNAS (Japanese Newspaper Article Sentence) database provided by ASJ (Acoustic Society of Japan). JNAS contains 306 speakers (153 males and 153 females) reading excerpts from the Mainichi Newspaper (100 sentences) and the ATR 503 PB Sentences (50 phonetically balanced sentences). As in the experiments described above, White Gaussian noise was added to the testing utterances at different SNR levels. In this experiment, 35 context-independent monophone HMMs were deployed with three states per model and nominal 16 gaussian mixture densities per state in our experiments. Japanese phone recognition was performed with the constraint of syllable topology. The further experiments, as illustrated in FIG. 8, show that the SISM algorithm can overcome the retrained performances which are usually viewed as the upper bounds at all SNR levels. Horizontally, the SNR is shown in dB. Vertically the respective error rates are shown (in percentages).

What is claimed is:

1. A method of processing a degraded speech input signal; the method including:
   receiving the degraded speech input signal;
   estimating a signal condition comprising at least one of signal-to-noise ratio (SNR) and bandwidth of the received input signal;
   selecting a processing model corresponding to the estimated signal condition wherein SNR-incremental stochastic matching (SISM) is selected if the estimation is of the signal-to-noise ratio, and Bandwidth-incremental stochastic matching (BISM) is selected if the estimation is of the bandwidth;
   estimating an originally uttered speech signal based on the received input signal; and
   processing the estimated original signal using the selected model, and wherein the processing includes varying the processing model by the function of the estimated signal condition.

2. The method as claimed in claim 1, wherein the step of estimating the originally uttered speech signal includes determining a most likely uttered speech signal given the predetermined processing model.

3. The method as claimed in claim 2, wherein the predetermined processing model is a processing model selected as corresponding to the estimated signal condition.

4. The method as claimed in claim 3, wherein the method includes iteratively:
   performing a new estimate of the signal condition of the received input signal;
   selecting a processing model corresponding to the newly estimated signal condition;
   estimating an originally uttered speech signal based on the estimated original signal of an immediately preceding iteration given the selected processing model;
   processing the estimated original signal according to the selected model;
   and terminating the iteration when a predetermined condition is met.

5. The method as claimed in claim 4, wherein the iteration is terminated if a processing result no longer improves.

6. The method as claimed in claim 4, wherein performing a new estimate of the signal condition includes selecting a more degraded signal condition.

7. A method as claimed in claim 1, wherein the speech processing involves recognizing speech and the processing model is a speech recognition model.

8. A method as claimed in claim 1, wherein the speech processing involves coding speech and the processing model is a speech codebook/encoder.

9. The method as claimed in claim 1, the method including generating the processing model by divergence-based model separation for discriminative training of a given model; the separation including:
   estimating a divergence-based discriminant function; and
   performing an adaptive learning step for model parameters based on minimizing a function of error rate.

10. The method as claimed in claim 1, wherein the discriminant function is directly obtained from the relative divergence instead of being driven by input speech data.

11. The method as claimed in claim 1, wherein the selection of the estimated signal condition includes both SNR and bandwidth, and the processing of the speech model by the function of the estimated signal condition includes varying both SNR and bandwidth.

12. A speech processing system for processing a degraded speech input signal; the system including:
   an input for receiving the degraded speech input signal;
   means for estimating a signal parameter condition of the received input signal;
   means for selecting a processing model corresponding to the estimated signal condition;
   means for estimating an originally uttered speech signal based on the received input signal; and
   means for processing the estimated original signal according to the selected model that include means for varying the processing model by the function of the estimated signal condition,
   wherein the means for selecting the estimated signal condition includes means for selecting both SNR and bandwidth, and the processing of the speech model by the function of the estimated signal condition includes varying both SNR and bandwidth.

13. A speech processing system for processing a degraded speech input signal; the system including:
   a processor configured to (1) receive the degraded speech input signal, (2) estimate a signal parameter condition of the received input signal, wherein at least one of signal-to-noise ratio (SNR) and bandwidth of the received input signal, (3) select a processing model corresponding to the estimated signal condition, (4) estimate an originally uttered speech signal based on the received input signal; and (5) process the estimated original signal according to the selected model that include means for varying the processing model by the function of the estimated signal condition.

* * * * *